United States Patent Office 2,816,884
Patented Dec. 17, 1957

2,816,884
PROCESS FOR THE PRODUCTION OF AROMATIC O-HYDROXYDIAZO COMPOUNDS

Hans Ackermann, Riehen, near Basel, and Guido Schetty, Basel, Switzerland, assignors to J. R. Geigy A. G., Basel, Switzerland, a Swiss firm No Drawing. Application July 16, 1954
Serial No. 443,964

Claims priority, application Switzerland July 20, 1953

7 Claims. (Cl. 260—141)

The present invention concerns an improved process for the production of aromatic o-hydroxydiazo compounds which are valuable intermediate products. In particular it is concerned with the production of aromatic diazoxides which are valuable as intermediate products for metallisable azo dyestuffs from diazonium compounds which produce azo dyestuffs which cannot be metallised. The intermediate products according to this invention are also produced in better yields and greater purity.

It is known that diazonium compounds of the benzene and naphthalene series containing a substituent with an electron attracting influence in the o-position to the diazonium group such as e. g. halogen, a sulphonic acid or, preferably, a nitro group, tend to exchange this negative group for the hydroxyl group while forming aromatic diazoxides particularly if there is a second substitutent with a negative influence in the o- or, preferably, the p-position to the diazonium group. This exchange of the substituent in the o-position having a negative influence for the hydroxyl group is brought about by reduction of the concentration of hydrogen ions of the mineral acid reaction medium. According to the composition of the diazonium compound and the mobility of the negative substituent in the o-position to the diazonium group, it is necessary to neutralise the mineral acid reaction medium which is necessary for the diazotisation to a pH corresponding to between weakly acid, e. g. organic acid, neutral or weakly alkaline. As it is known however, that diazonium compounds decompose very easily, such conversions are often accompanied to a great extent by side reactions which not only greatly reduce the yields but also render the conversion product so impure that it is often not suitable for the production of dyestuffs which can be used for the dyeing of textiles. This is particularly the case when the benzene ring carrying the diazonium group is not suitably substituted by a sulphonic acid group, e. g. in the p-position to the diazonium group.

It has now been found that aromatic o-hydroxydiazo compounds can be produced in better yields and greater purity by adding stabilisers for the diazonium compound to mineral acid solutions of unsulphonated diazonium compounds of the general formula:

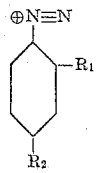

in which $R_1$ and $R_2$ represent non-ionogenic substituents with an electron attracting influence and in which the benzene ring can be further substituted and can also be part of an annulated ring system, and then neutralising the mineral acid thus raising the pH value of the medium, preferably up to a pH of 6–11, so that $R_1$ is replaced by the hydroxyl group.

In this formula $R_1$ represents, e. g. a halogen atom, or preferably, a nitro group whilst $R_2$ can be for example, a nitro, an alkyl keto or aryl keto, a cyano, a sulphonic acid amide group, a sulphonic acid amide group organically substituted at the nitrogen atom, a sulphonic acid aryl ester, an alkyl, cycloalkyl or aryl sulphone group. If necessary, suitable substituents can also be further substituted, e. g. by halogen, alkyl, alkoxy or sulphonic acid amide groups.

Compounds of the general formula in which $R_1$ represents a nitro group are of particular interest. They can be easily obtained technically by nitration of an acylamino, alkoxy or halogen compound which is negatively substituted in the p-position, and saponification of the acyl-amino group or exchange of the alkoxy or halogen substituents for the amino group and then diazotisation of the amino compound obtained by methods known per se. The strongly negative nitro group is particularly easily replaced by the hydroxyl group, and some of the nitrous acid which splits off can often be used for the diazotisation of another amino compound. Compounds of the general formula are also of particular interest in which $R_2$ represents an —$SO_2$—X— group, in which X represents an alkyl, aryl, cycloalkyl or an aryloxy group, because up to now the o-hydroxydiazo compounds corresponding to them could only be produced with difficulty in a different way and were only available in yields which were technically insufficient.

Particularly valuable for the production of azo dyestuffs containing heavy metal, are the new o-hydroxydiazo compounds of the benzene series wherein X represents a low molecular alkyl or a chloromethyl group.

The diazonium compounds usable according to this invention can be produced in the usual way by diazotising corresponding amines with sodium nitrite in a strongly mineral acid solution. It is often of advantage to diazotise o-nitroamines in concentrated sulphuric acid with finely powdered dry alkali nitrite or with nitrosyl sulphuric acid while gradually diluting the acid with ice.

In the process according to the present invention, the usual stabilisers for diazonium compounds can be used, preferably however, those which are not disadvantageous in the production of metallisable azo dyestuffs, in particular aromatic sulphonic acids and the alkali salts thereof such as e. g. toluene sulphonic acid, xylene sulphonic acid, naphthalene-1- and/or-2-sulphonic acid, naphthalene-2,7-disulphonic acid and tetralin sulphonic acid. If desired however, also other usual stabilisers can be used such as, e. g. zinc chloride or fluoboric acid or the soluble salts thereof. It is advantageous to mix the stabilisers in the form of aqueous solutions—for the listed aromatic sulphonic acids preferably those of the alkali salts—in the cold with the diazonium compound. They then serve to dilute the mineral acid. A particularly advantageous way of performing the process according to the present invention consists in the dropwise addition of the diazo solution mixed with the stabiliser to an ice cold aqueous solution of sodium carbonate which is sufficient to neutralise the mineral acid. The increases in yield of o-hydroxydiazo compounds which can be obtained by the presence of these stabilisers in many cases exceeds 20% of the theoretical.

The compounds produced by the method of the present invention are useful as diazo components in the preparation of metallisable azo dyestuffs.

The following examples illustrate the invention without limiting it in any way. Where not otherwise stated, parts are given as parts by weight and the temperatures are in degrees centigrade. The relationship of parts by weight to parts by volume is as that of kilogrammes to litres.

Example 1

21.6 parts of 3-nitro-4-aminobenzene-1-methyl sulphone are stirred at room temperature in nitrosyl sulphuric acid, produced from 70 parts of sulphuric acid and 8 parts of dry sodium nitrite until the diazotisation is complete. The mixture is then poured into 200 parts of water and ice so that the temperature is kept continually at 0°. A warm solution of the sodium salt of 14.4 parts of naphthalene-2,7-disulphonic acid is added and the reaction is made neutral while stirring well with 30% caustic soda lye until a sample, even after 5 minutes, is weakly alkaline on brilliant yellow paper. The temperature is kept at 0° by the addition of ice. A test with 2-hydroxynaphthalene-6,8-disulphonic acid shows that the original diazonium compound has disappeared. The diazoxide formed partly precipitates as a brown-yellow precipitate from the solution. The yield of diazoxide obtained by soda alkaline coupling with 1-phenyl-3-methyl-5-pyrazolone is considerably higher than that obtained without the addition of naphthalene sulphonic acid.

Example 2

23 parts of 3-nitro-4-aminobenzene-1-ethyl sulphone are diazotised as described in Example 1 and the mixture is poured into a solution of 20.8 parts of naphthalene-2-sulphonic acid, the temperature of which is kept at 0° by the addition of ice. After stirring for a short time, most of the diazonium compound precipitates in crystal form. On the addition of a great deal of ice, the reaction is neutralised with caustic soda lye until it remains neutral to litmus paper. The original diazonium compound, which can be recognised by tests for dyestuff formation with 2-hydroxy-naphthalene-6,8-disulphonic acid, has then disappeared and some of the diazoxide precipitates. If the naphthalene sulphonic acid is not used, the yield is greatly reduced and the diazoxide partially precipitates in a greasy form.

Example 3

18.3 parts of 2,4-dinitraniline are diazotised as described in Example 1 and the mixture is poured into a solution of 20.8 parts of naphthalene-2-sulphonic acid in 200 parts of water and so much ice that the temperature remains low. The diazo compound is then added to a solution of 80 parts of soda calc. in 1000 parts of water, the temperature being kept at 0° by the addition of ice. The diazoxide, which is formed immediately, partly precipitates in a brown-orange form. The addition of naphthalene sulphonic acid greatly increases the yield.

Example 4

25.1 parts of 3-nitro-4-aminobenzene-1-chloromethyl sulphone are diazotised as described in Example 1 and the mixture is poured, while cooling with ice, into a solution of 21.2 parts of tetralin sulphonic acid in 200 parts of water. The stabilised diazonium compound is then added to a solution of 80 parts of soda calc. in 1000 parts of water. The temperature is kept at 0° by the addition of ice. The yield of diazoxide is increased by the addition of tetralin sulphonic acid. An analogous effect is obtained, if, instead of tetralin sulphonic acid, 17.2 parts of toluene sulphonic acid or 18.6 parts of xylene sulphonic acid are used.

The following amines can be converted into their diazoxides according to the methods described above:

3-nitro-4-aminobenzene-vinyl sulphone,
3-nitro-4-aminobenzene-phenyl sulphone,
3-nitro-4-aminobenzophenone,
3-nitro-4-aminoacetophenone,
3-nitro-4-aminobenzonitrile,
3-nitro-4-aminobenzene-1-sulphonic acid dimethylamide,
3-nitro-4-aminobenzene-1-sulphonic acid morpholide,
3-nitro-4-amino-4'-methyl-diphenyl sulphone,

What we claim is:

1. In the process for the manufacture of a diazoxide from a cold aqueous sulfuric acid solution of a diazonium compound of the formula

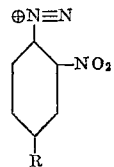

wherein R represents a non-ionogenic negative substituent, by the gradual neutralization of the acid, the improvement of adding an isocyclic-aromatic sulfonic acid selected from the group consisting of phenyl sulfonic and naphthyl sulfonic acids and the alkali metal salts thereof to said acid diazonium compound solution before said neutralization step.

2. In the process for the manufacture of a diazoxide from a cold aqueous sulfuric acid solution of a diazonium compound of the formula

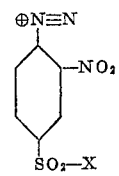

wherein X represents an aliphatic radical, by the gradual neutralization of the acid, the improvement of adding an isocyclic-aromatic sulfonic acid selected from the group consisting of phenyl sulfonic and naphthyl sulfonic acids and the alkali metal salts thereof to said acid diazonium compound solution before said neutralization step.

3. In a process for the manufacture of a diazoxide from a cold aqueous sulfuric acid solution of a diazonium compound of the formula

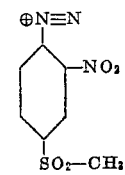

by the gradual neutralization of the acid, the improvement of adding an isocyclic-aromatic sulfonic acid selected from the group consisting of phenyl sulfonic and naphthyl sulfonic acids and the alkali metal salts thereof to said acid diazonium compound solution before said neutralization step.

4. In a process for the manufacture of a diazoxide from a cold aqueous sulfuric acid solution of a diazonium compound of the formula

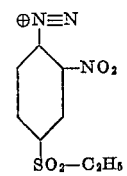

by the gradual neutralization of the acid, the improvement of adding an isocyclic-aromatic sulfonic acid selected from the group consisting of phenyl-sulfonic and naphthyl sulfonic acids and the alkali metal salts thereof to said acid diazonium compound solution before said neutralization step.

5. In a process for the manufacture of a diazoxide from a cold aqueous sulfuric acid solution of a diazonium compound of the formula

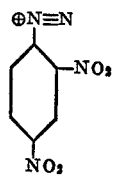

by the gradual neutralization of the acid, the improvement of adding an isocyclic-aromatic sulfonic acid selected from the group consisting of phenyl sulfonic and naphthyl sulfonic acids and the alkali metal salts thereof to said acid diazonium compound solution before said neutralization step.

6. In a process for the manufacture of a diazoxide from a cold aqueous sulfuric acid solution of a diazonium compound of the formula

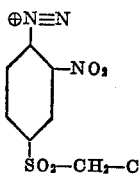

by the gradual neutralization of the acid, the improvement of adding an isocyclic-aromatic sulfonic acid selected from the group consisting of phenyl sulfonic and naphthyl sulfonic acids and the alkali metal salts thereof to said acid diazonium compound solution before said neutralization step.

7. In a process for the manufacture of a diazoxide from a cold aqueous sulfuric acid solution of a diazonium compound of the formula

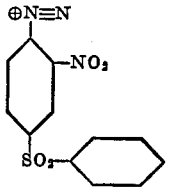

by the gradual neutralization of the acid, the improvement of adding an isocyclic-aromatic sulfonic acid selected from the group consisting of phenyl sulfonic and naphthyl sulfonic acids and the alkali metal salts thereof to said acid diazonium compound solution before said neutralization step.

References Cited in the file of this patent

UNITED STATES PATENTS

| | | |
|---|---|---|
| 1,744,903 | Keller et al. | Jan. 28, 1930 |
| 1,905,354 | Sack | Apr. 25, 1933 |
| 2,062,873 | Flett | Dec. 1, 1936 |
| 2,443,226 | Carson | June 15, 1948 |
| 2,551,056 | Schetty | May 1, 1951 |
| 2,778,815 | Ackermann | Jan. 22, 1957 |

OTHER REFERENCES

Morgan: Journal Chem. Soc. (London), vol. 107, (1915) pp. 645–50.

Hodgson et al.: Society of Dyers and Colorists, January 1944, p. 16.

Saunders: The Aromatic Diazo Compounds, 2nd ed., 1949, pp. 30, 117, 121, 122.